(12) United States Patent
Sternitzke

(10) Patent No.: US 8,049,354 B2
(45) Date of Patent: Nov. 1, 2011

(54) FLOW POWER CONVERTER APPARATUS EMPLOYING A FLOW-CONTROLLED DUCT TO CAPTURE FLOW ENERGY

(76) Inventor: Donald Alan Sternitzke, Colorado Springs, CO (US)

( * ) Notice: Subject to any disclaimer, the term of this patent is extended or adjusted under 35 U.S.C. 154(b) by 561 days.

(21) Appl. No.: 12/333,216

(22) Filed: Dec. 11, 2008

(65) Prior Publication Data

US 2009/0096214 A1   Apr. 16, 2009

Related U.S. Application Data

(63) Continuation-in-part of application No. 11/845,778, filed on Aug. 27, 2007, now Pat. No. 7,479,708.

(51) Int. Cl.
  *F03B 13/26* (2006.01)
(52) U.S. Cl. .......................................... 290/53
(58) Field of Classification Search ............... 290/53
  See application file for complete search history.

(56) References Cited

U.S. PATENT DOCUMENTS

| | | | | |
|---|---|---|---|---|
| 430,790 | A | * | 6/1890 | Starkenberg .................. 405/76 |
| 1,507,461 | A | | 9/1924 | Chase |
| 3,785,159 | A | * | 1/1974 | Hammond ..................... 405/77 |
| 4,013,379 | A | | 3/1977 | Bodling |
| 4,040,257 | A | | 8/1977 | Andrews |
| 4,078,871 | A | | 3/1978 | Perkins, Jr. |
| 4,139,984 | A | | 2/1979 | Moody et al. |
| 4,216,655 | A | | 8/1980 | Ghesquiere |
| 4,263,516 | A | | 4/1981 | Papadakis |
| 4,332,506 | A | | 6/1982 | Andrews |
| 4,622,471 | A | | 11/1986 | Schroeder |
| 5,443,361 | A | | 8/1995 | Skaarup |
| 6,527,504 | B1 | | 3/2003 | Skaarup |
| 6,877,968 | B2 | * | 4/2005 | Godsall et al. ................ 418/268 |
| 7,040,089 | B2 | | 5/2006 | Andersen |
| 7,144,197 | B2 | * | 12/2006 | Black .............................. 405/79 |
| 7,478,811 | B2 | * | 1/2009 | Johnson ..................... 273/138.5 |
| 7,479,708 | B1 | * | 1/2009 | Sternitzke ....................... 290/53 |

OTHER PUBLICATIONS

Kikuchi et al, Development of Wave Power Generating System With Water Valve Rectifier, IEEE Trans. Magnetics, V37, N4, Jul. 2001, pp. 2865-2867.

* cited by examiner

*Primary Examiner* — Joseph Waks
(74) *Attorney, Agent, or Firm* — James Albert Ward

(57) ABSTRACT

A wave power converter employing a flow-controlled duct for capturing and converting useful wave surge energy to electric power over a relatively broad range of surf or river flow conditions. The power converter includes an inclined ramp with several openings for receiving wave or river water and retaining surge water in hydraulic isolation, permitting water to flow into a flow-controlled conduit and a generator for producing electrical power from water flow in the conduit. The power converter apparatus is suitable for low-cost manufacture, offers simple robust operation suitable for underdeveloped regions of the world, may be fabricated from commonly-available components, requires few moving parts and no valuable (lootable) components other than a generator, and is self-flushing for low maintenance operation.

20 Claims, 14 Drawing Sheets

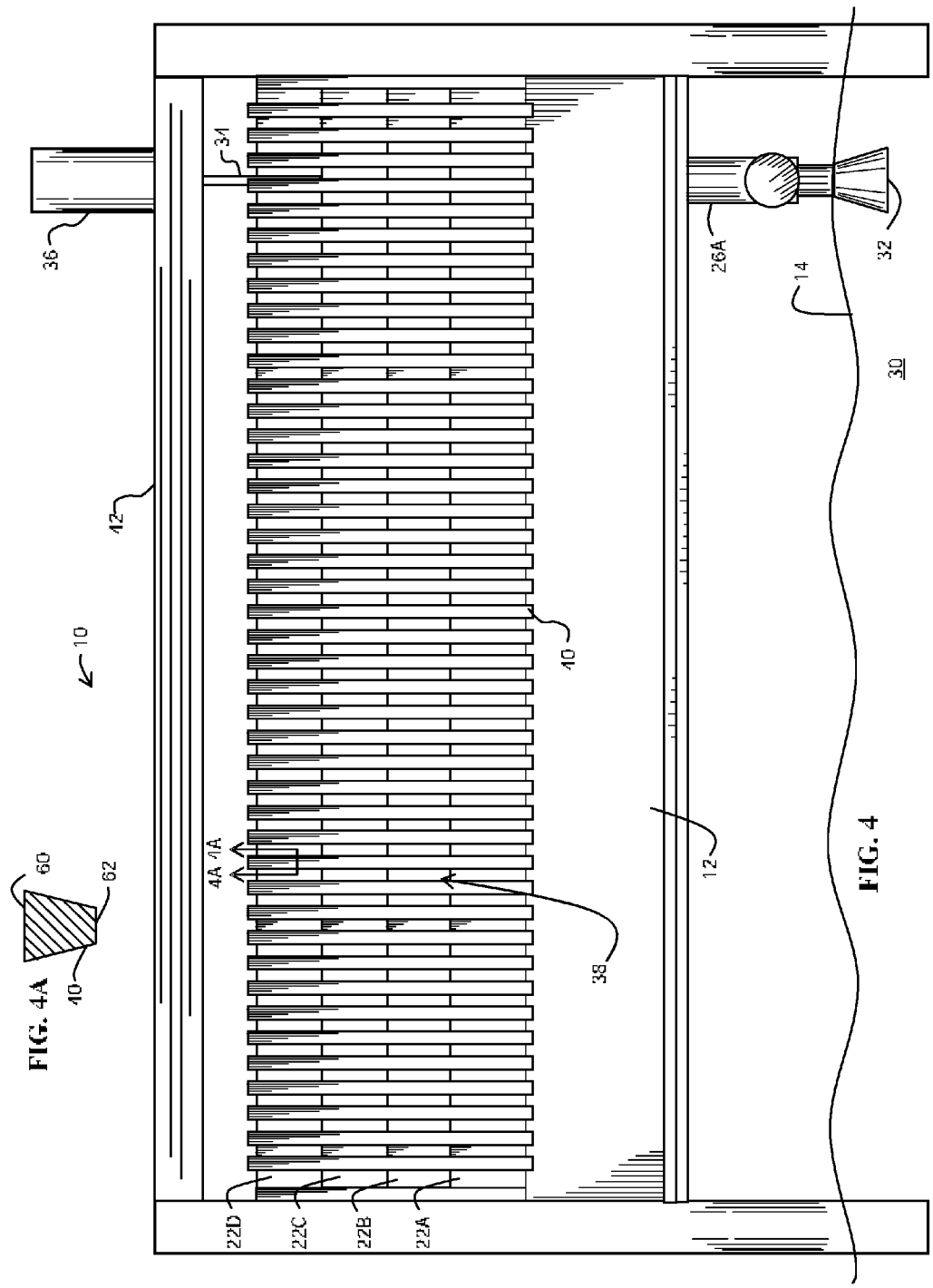

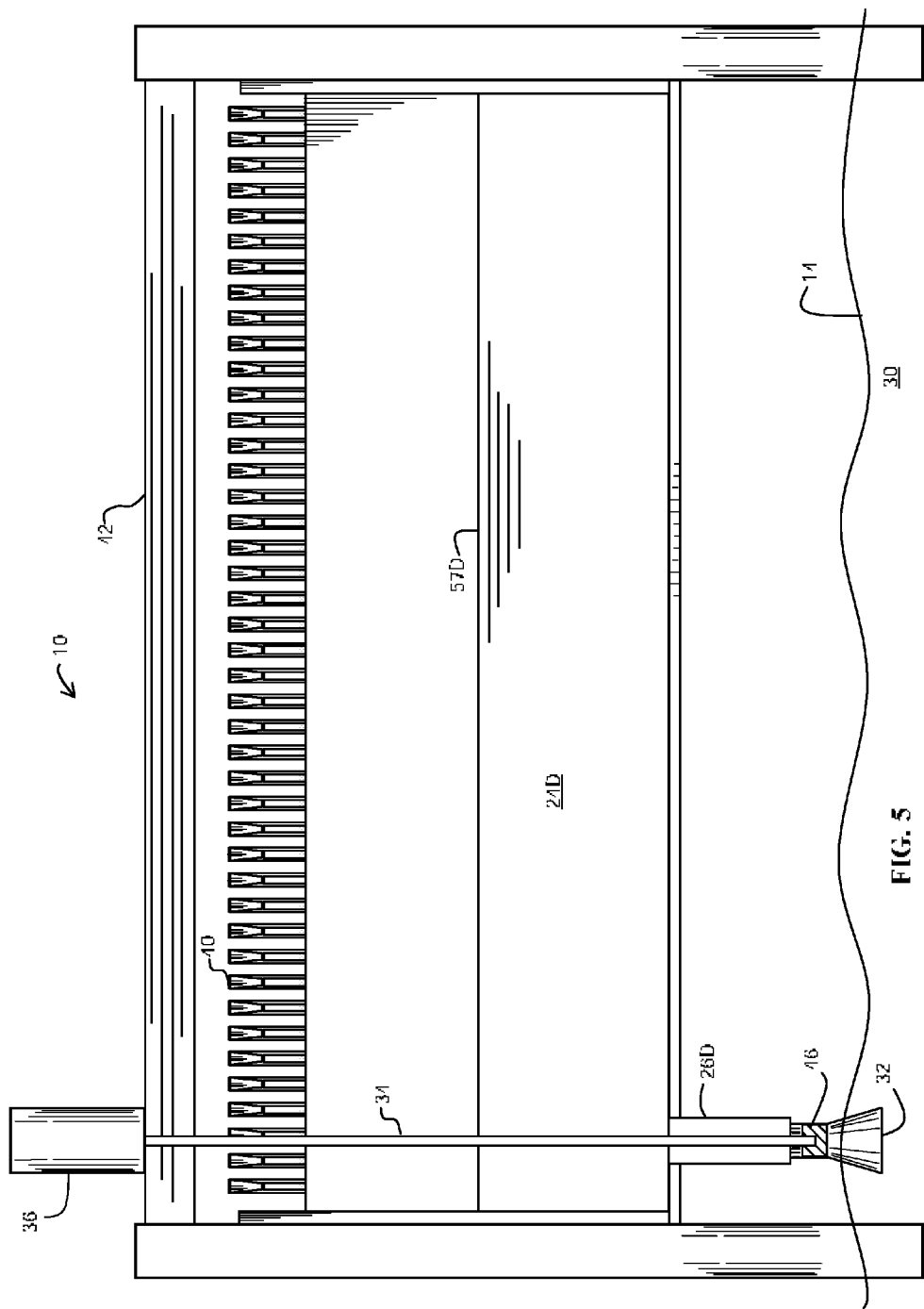

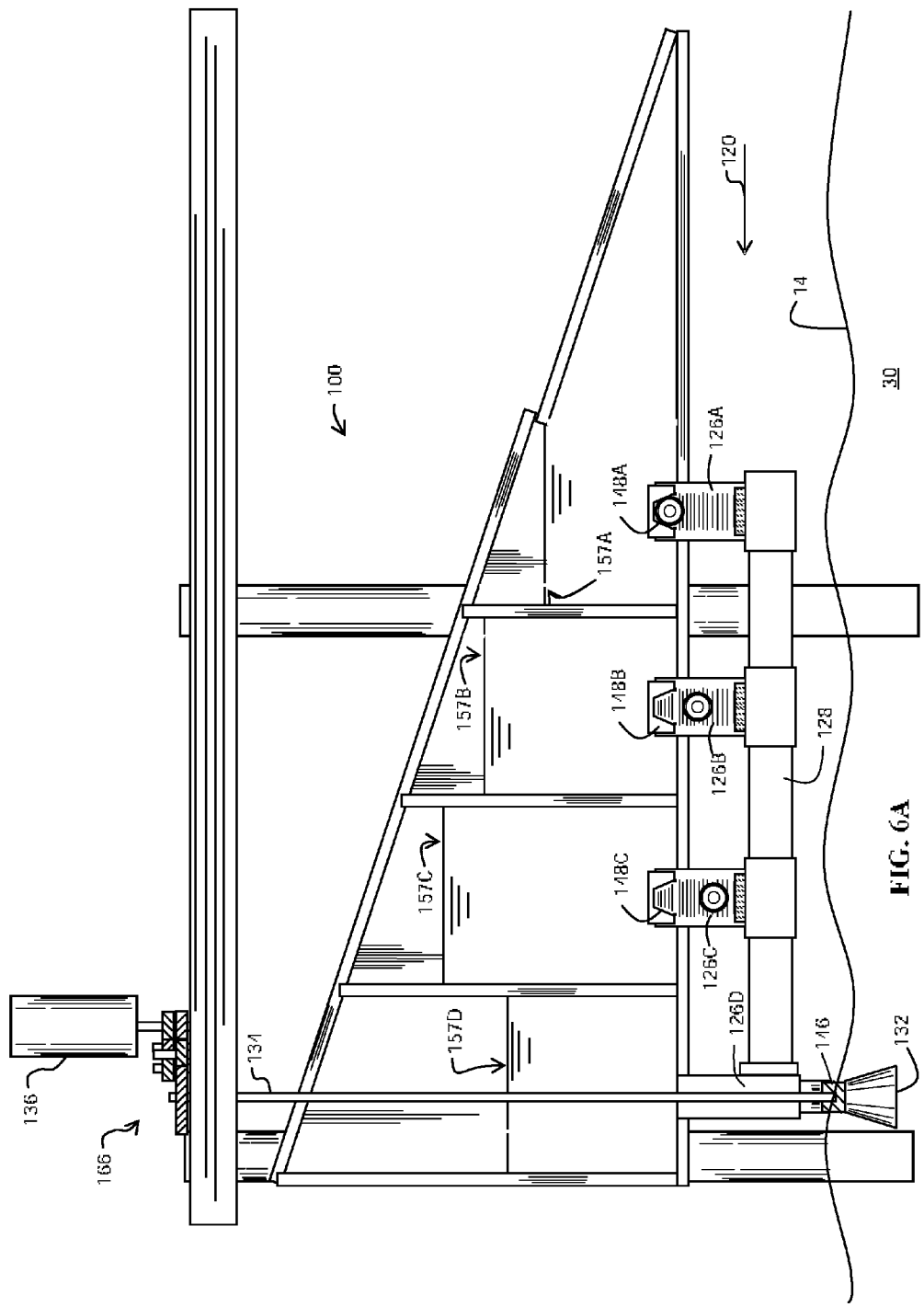

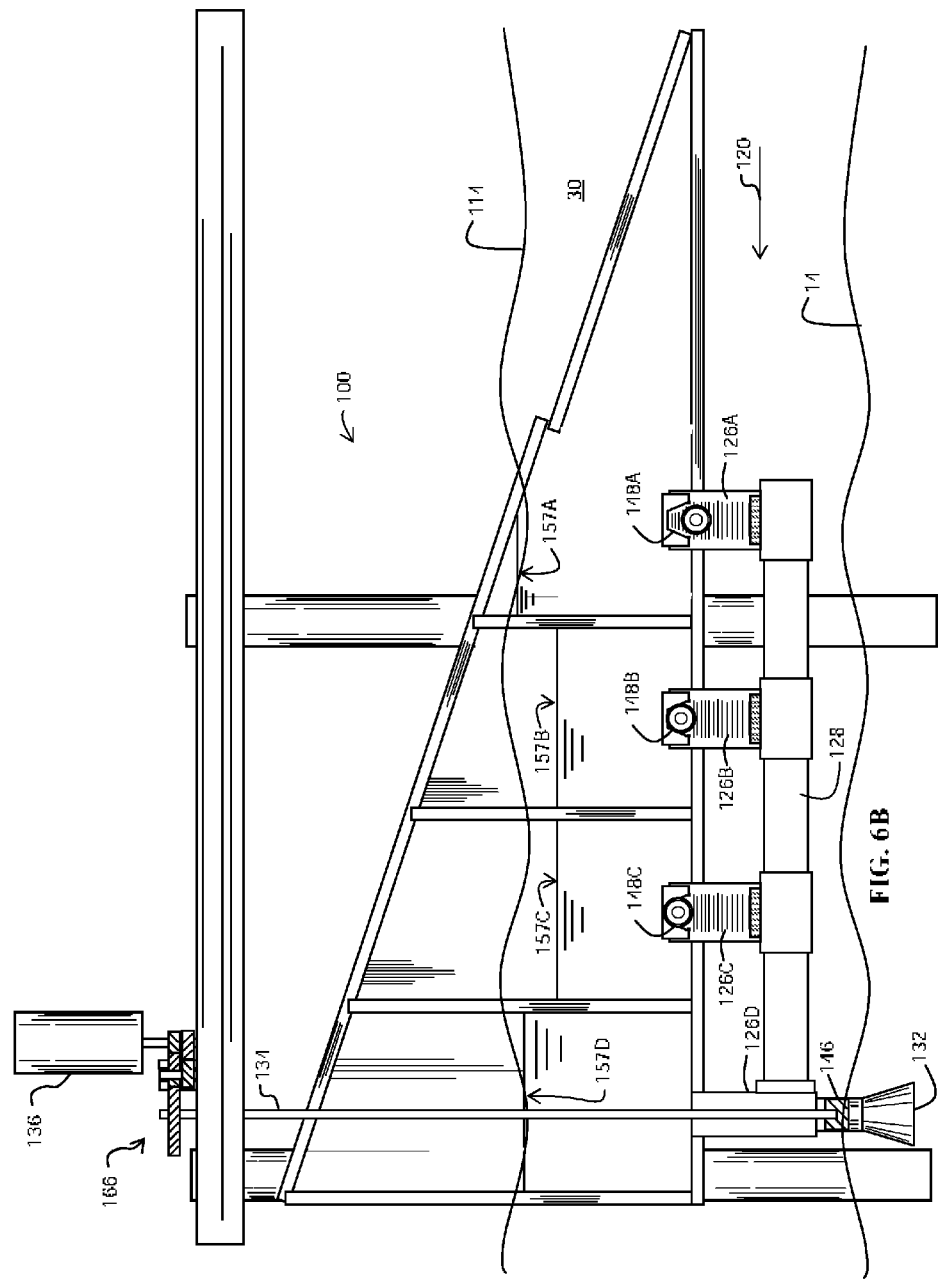

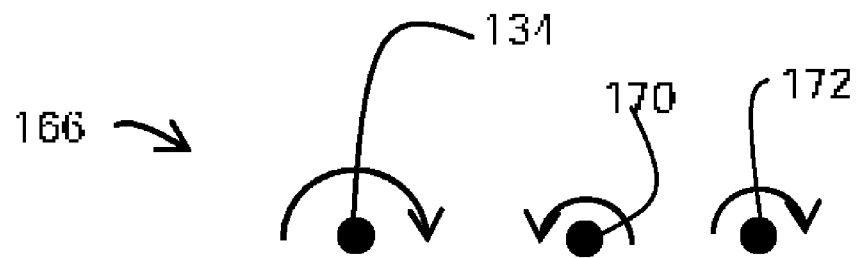
FIG. 7A
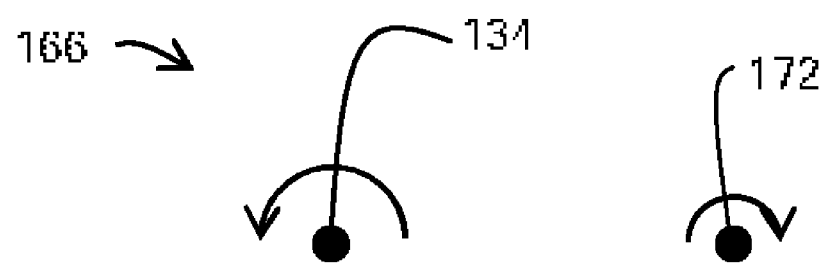
FIG. 7B
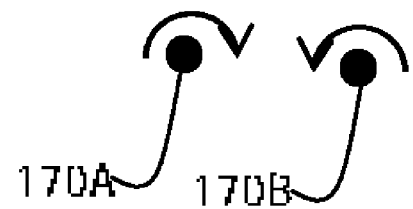

FLOW POWER CONVERTER APPARATUS EMPLOYING A FLOW-CONTROLLED DUCT TO CAPTURE FLOW ENERGY

CROSS-REFERENCE TO RELATED APPLICATIONS

This application is filed under 37 C.F.R. §1.53(b) as a Continuation-In-Part of U.S. patent application Ser. No. 11/845,778 filed on Aug. 27, 2007 by the same inventor and now issued as U.S. Pat. No. 7,479,708 B1 on Jan. 20, 2009.

BACKGROUND OF THE INVENTION

1. Field of the Invention

This invention relates generally to a flow power converter and more particularly to a flow power converter employing a flow-controlled duct to capture both vertical and horizontal components of surge energy from overtopping waves and river flows.

2. Description of the Related Art

Wave power as a means of generating electricity has been the focus of low-key study in the US and Europe for over thirty years, but with little public support. Wave energy flux arises primarily from wind friction at the sea surface and is entirely distinct from the diurnal flux of tidal energy arising from the lunar cycle and from the steady flow of the major ocean currents arising primarily from the several solar heating and cooling cycles. Wave power generation is not a widely employed technology. The world's first commercial wave energy conversion farm, the Aguççadora Wave Park in Portugal, was established in 2006. Public interest in this carbon-free power source is now growing because of recent public concern over the accumulating effects of atmospheric carbon loading on world climate.

Ocean waves are generated from a portion of the wind energy coupled to the ocean surface over large areas and the available wave energy in a local region is greater than the solar and wind energies available in the same area. Wave energy available from U.S. coasts alone exceeds the entire U.S. production of coal-fired electrical power, constitutes a perpetual, renewable energy source, and is perhaps the only carbon-free energy source suitable for replacing carbon-based power production on a very large scale without concomitant environmental effects.

The prior art is replete with wave power conversion proposals. Wave power conversion devices may be generally categorized by the choice of energy capture method used to capture the wave energy. They may also be categorized by choice of location and by choice of power extractor. Types of energy capture methods well-known in the art include point absorber or buoy; surfacing and following or attenuator; terminator with perpendicular alignment to wave propagation; oscillating water column; and overtopping. Location types well-known in the art include shoreline, near-shore and off-shore. Well-known types of power extraction systems include: hydraulic ram, elastomeric hose pump, pump-to-shore, hydroelectric turbine, air turbine, and linear electrical generator.

For example, in U.S. Pat. No. 4,622,471, Schroeder proposes a terminator system using a plurality of units with unidirectional intake gates disposed horizontally at one elevation to operate independently to capture wave surges upstream from an input penstock. They are adapted to intercept waves and convert their kinetic energy to drive a turbine. Each gate unit includes a horizontally-hinged movable gate adapted to permit the incoming waves to slide over the upper surfaces of the gates and into the penstock. The penstock back pressure operates to push each gate upward to direct the remaining forward moving wave energy to a higher elevation, thereby increasing the water head in the penstock. Schroeder controls the penstock head by applying the same penstock back pressure to every gate unit, which are accordingly hydraulically coupled to one another (not in hydraulic isolation). Schroeder neither considers nor suggests adapting his wave power converter to an overtopping method that retains the captured water at different head pressures in a plurality of substantially isolated chambers each coupled to a penstock, some by way of a check valve.

As another example, in U.S. Pat. No. 7,040,089, Andersen proposes an overtopping wave power station device of the kind where the waves flow up a ramp provided with fixed openings arranged so that little of the water flowing up the ramp flows down through the openings and water flowing down the ramp flows down through the openings and into storage reservoirs positioned below the ramp and extending horizontally at various elevations. Andersen couples each storage reservoirs to an associated penstock and turbine intake. All turbine outlets are coupled together, thereby equalizing the head pressures. Andersen relies on ramp intake closing devices to reduce water and head losses at the ramp openings to the lower storage reservoirs and neither considers nor suggests adapting his overtopping wave power converter to retain the captured water at different head pressures in a plurality of substantially isolated chambers each coupled to a penstock, some by way of a check valve.

In U.S. Pat. No. 4,216,655, Ghesquiere discloses a wave-operated power plant configured to optimally exploit the horizontal force component from the incoming waves.

Normally, the relation between output and investment grows advantageously with the size of the plant. In many cases, it pays to build large plants. However, a large rotating machine, such as a turbine equipped with a generator, costs more than a number of smaller machines with a corresponding total capacity. Complex systems such as hydraulic control systems, are not well suited to incremental implementation (do not scale up well), and have high costs and risks associated with large installations.

Traditionally, low head water turbines have been of an open type, as exemplified for example by conventional water wheels, and have had extremely low efficiency. Conventional power generation turbines such as Francis turbines and Peleton turbines traditionally require high heads of water to generate the water pressure and velocity required to move the turbine blades. Such arrangements require large high dams, additional flumes and the like, requiring massive capital expenditures. A more efficient class of turbines, such as the Root Turbine, for example, can be economically constructed to operate at the higher efficiencies suitable for low head electric power generation applications requiring closed turbine systems to maintain siphon.

Another well-known challenge is to provide a wave power converter able to tolerate the sometimes volatile conditions of the sea surface. Some practitioners suggest selecting installation sites where the average waves are similar in scope to the extreme waves. Also, the wave power converter must withstand a major storm while also operating with acceptable efficiency during average wave conditions.

These unresolved problems and deficiencies are clearly felt in the art and are solved by this invention in the manner described below.

SUMMARY OF THE INVENTION

This invention solves the above described problems by introducing for the first time a flow power converter having means for the capture of vertical and horizontal wave surge energy components from a broad range of wave and river flow conditions and a flow-controlled conduit to facilitate a stable supply of hydraulic head pressure for conversion to electrical power.

It is a purpose of the apparatus of this invention to provide flow power converter apparatus employing surge energy capture for converting useful wave surge energy over a relatively broad range of surf conditions, including relatively calm surf conditions and abnormally higher surf conditions. It is an advantage of the apparatus of this invention that some energy may be captured from low surf and more energy may be captured from higher surf without the need for adjusting the apparatus. It is a feature of the apparatus of this invention that the storage chamber and flow-controlled duct are disposed to capture and convert a significant amount of the horizontal surge kinetic energy component into potential energy in the form of elevated hydraulic head.

It is another purpose of this invention to provide a flow surge power converter suitable for low-cost manufacture and simple robust operation in underdeveloped regions of the world. It is an advantage of the apparatus of this invention that it is suitable for fabrication from low-cost commonly-available components. It is another advantage of the apparatus of this invention that it has few moving parts, has no valuable (lootable) components other than a generator, is self-flushing and requires little maintenance.

In one aspect, the invention is a wave surge power converter including a plurality of openings each disposed on an incline at an elevation to receive wave surge water when a wave surges up the incline; a storage chamber coupled to one or more of the ramp openings for capturing wave surge water received thereby and retaining the captured water; one or more check valves each disposed within one of the ramp openings to permit water flow into the storage chamber responsive to a hydraulic pressure difference across the check valve; a discharge duct defining a cross-sectional flow area (A) and having a length (L) disposed to hydraulically couple the storage chamber to an exit; and a generator for producing electrical power from a flow of captured water in the discharge duct arising from a hydraulic pressure difference between the storage chamber and the discharge duct exit.

In another aspect, the invention is a river flow power converter including a plurality of openings each disposed on an incline at an elevation to receive river flow water as the water flows over the incline; a storage chamber coupled to one or more of the ramp openings for capturing river flow water received thereby and retaining the captured water; a discharge duct defining a cross-sectional flow area (A) and having a length (L) disposed to hydraulically couple the storage chamber to an exit that is disposed so that the local hydraulic pressure at the discharge duct exit is reduced by the flow of river water over the discharge duct exit; and a generator for producing electrical power from a flow of captured water in the discharge duct arising from a hydraulic pressure difference between the storage chamber and the discharge duct exit.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 4, including detail FIG. 4A, is a diagram illustrating a front view of the apparatus of FIG. 1;

FIG. 5 is a diagram illustrating a rear view of the apparatus of FIG. 1 with the tail-wall removed to expose the interior of the rear chamber;

FIG. 6A is a diagram illustrating a side cross-sectional view of an alternative embodiment of the wave surge power converter apparatus of this invention showing exemplary check valve dispositions during normal flow conditions;

FIG. 6B is a diagram illustrating a side cross-sectional view of the wave surge power converter apparatus of FIG. 6A showing exemplary check valve dispositions during abnormal back-flow conditions; and FIGS. 7A-B are schematic diagrams illustrating a top view of an illustrative transmission embodiment suitable for use with the apparatus of FIGS. 6A-B under the two exemplary flow conditions illustrated in FIGS. 6A-B.

FIG. 11A, is a diagram illustrating a perspective view of a preferred "wedge" embodiment of a river flow power converter apparatus of this invention for capturing and converting river flow energy;

DETAILED DESCRIPTION OF THE EMBODIMENTS

Figure 1:
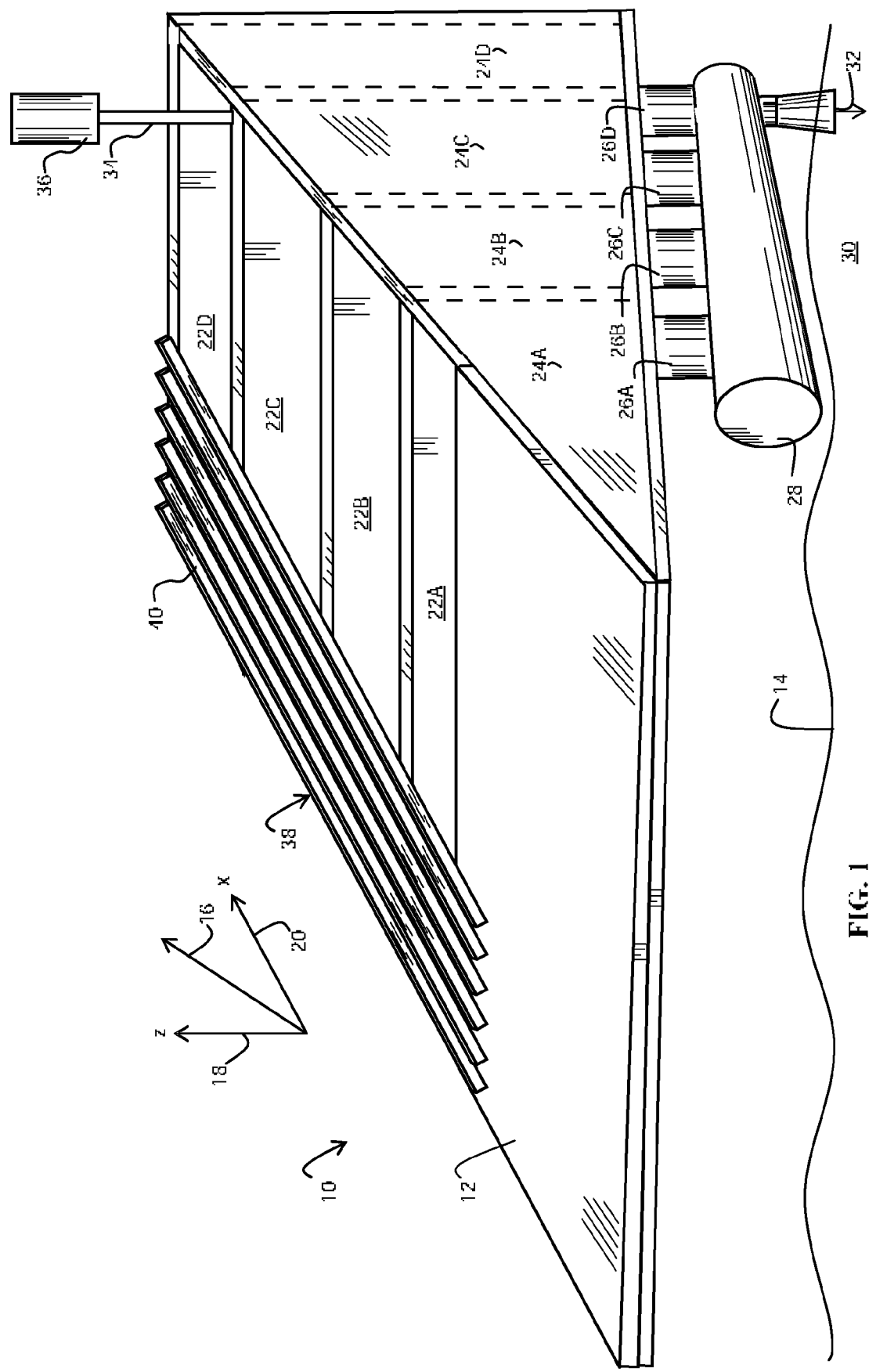
FIG. 1 is a diagram illustrating a perspective view of a first embodiment of the wave surge power converter apparatus of this invention.

FIG. 1 illustrates a first wave surge power converter embodiment 10 of this invention, showing the inclined ramp 12. During operation, converter 10 is preferably disposed at an ocean surface 14 having episodic wave surges generally oriented in the direction indicated by the arrow 16 such that a typical wave surges vertically generally along the vertical surge component 18 and horizontally generally along the horizontal surge component 20. Ramp 12 is shown with a slope of about 33% (17-18 degrees) and is preferably oriented generally along surge direction 16 such that the wave surge water moves up ramp 12, progressing along a series of openings 22A-D therein. Each of openings 22A-D that is thereby exposed to the wave surge then receives surge water into the associated one of the plurality of independent chambers 24A-D. Each of the first independent chambers 24A-C is substantially isolated hydraulically from its neighbors by means of a single check valve (described below in connection with FIGS. 2, 3 and 6A-B) disposed in the associated one of the plurality of drain assemblies 26A-C. No check valve is required in drain assembly 26D for the final chamber 24D because the hydraulic head in chamber 24D is made equal to the hydraulic head in conduit 28 for reasons described in more detail below. As may be readily appreciated from this description, any surge water captured within each chamber 24A-D flows down by gravity through the associated drain assembly 26A-D into a plenary conduit 28 and out into the ambient ocean 30 through the draft tube 32. This flow of captured water from each of one or more chamber(s) 24A-D through the associated drain assembly 26A-D into conduit 28 and out draft tube 32 arises from the hydraulic pressure difference between at least one chamber(s) 24A-D and ambient ocean 30 and may be employed to turn a low-head turbine (not visible, see FIGS. 2, 5 and 6A-B) within conduit 28 that is coupled by means of, for example, a shaft 34 to a generator 36 for generating electrical power. The substantial hydraulic isolation of chambers 24A-D is an important feature of converter 10 for reasons that are described in more detail below. Another important feature of converter 10 is the grill 38 or "trash rack" formed from a plurality of slats, exemplified by the slat 40 (FIG. 4A), disposed over openings 22A-D to prevent most floating debris from entering chambers 24A-D by facilitating the sloughing of debris back into the surf during the relaxation of the wave surges. For clarity, grill 38 is only partially illustrated in FIG. 1 and actually extends across the entire width of converter 10 to completely cover all of openings 22A-D.

Figure 2:
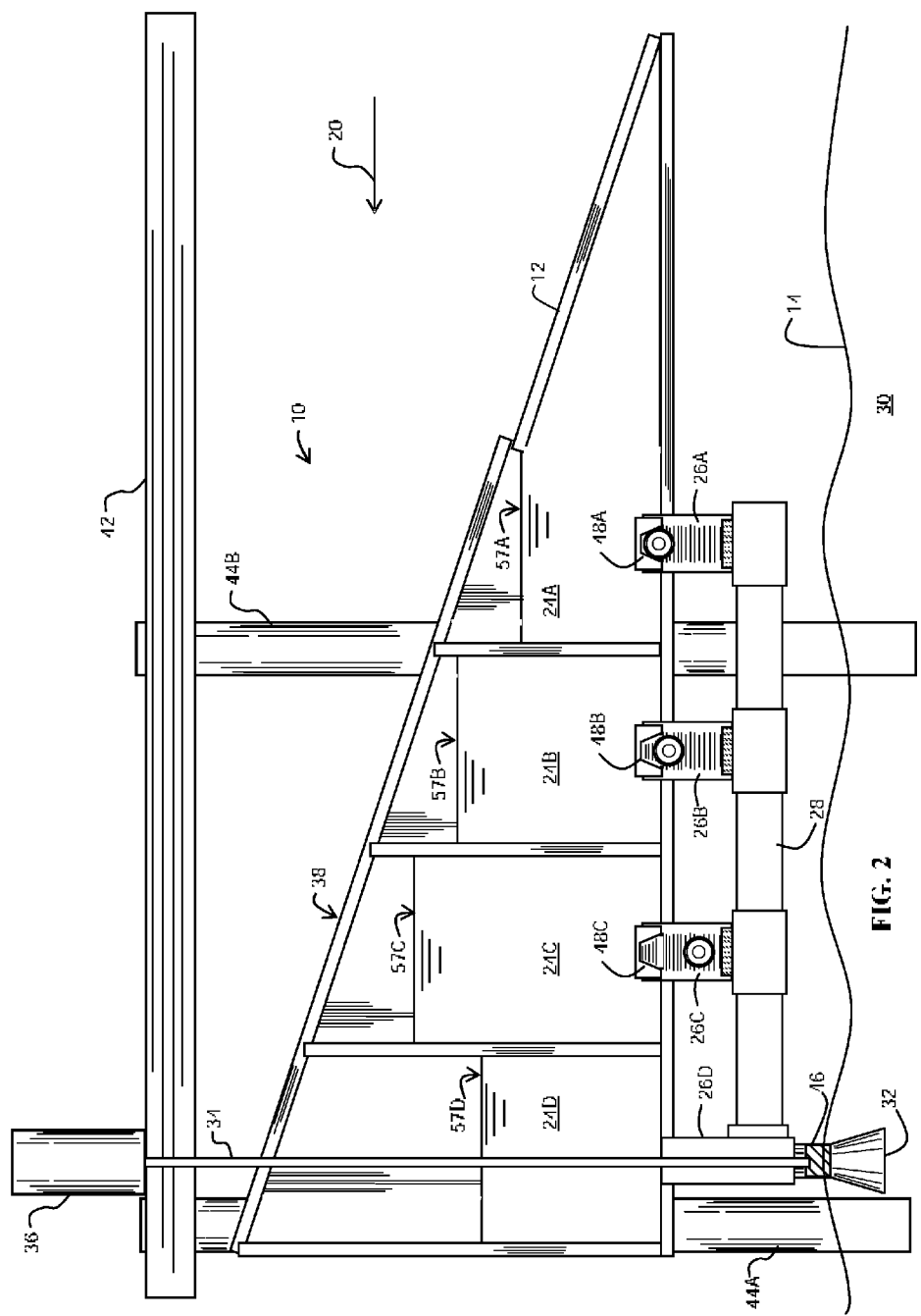
FIG. 2 is a diagram illustrating a side cross-sectional view of the apparatus of FIG. 1.
Figure 3:
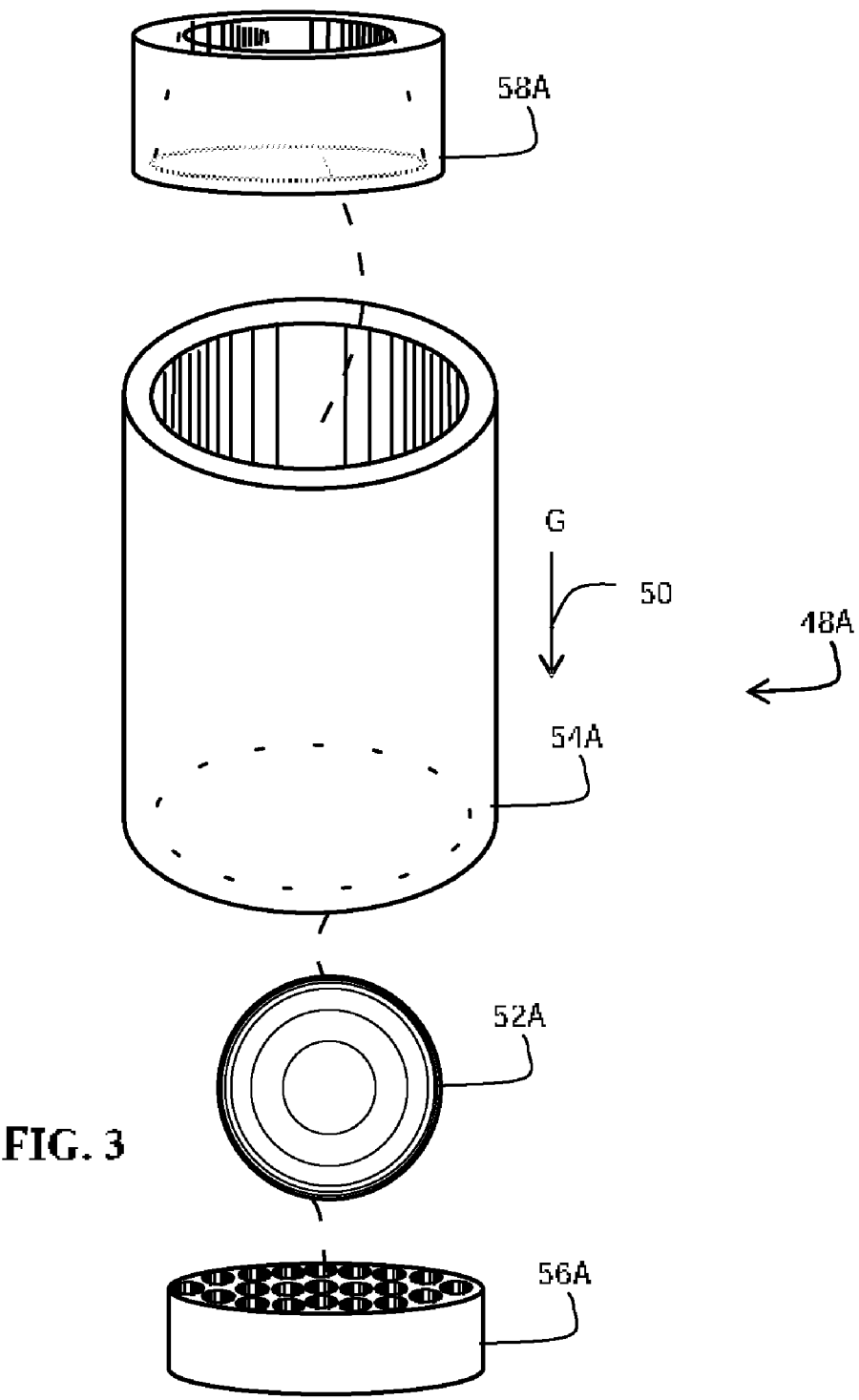
FIG. 3 is a diagram illustrating an exploded perspective view of a first check valve embodiment suitable for use with the apparatus of FIG. 1.

FIG. 2 is a diagram illustrating a side view of converter 10 disposed in an exemplary operating position under a pier 42 by means of, for example, the two structural supports 44A-B. The disposition of the closed low-head turbine 46 may also be seen in draft tube 32 and the disposition of each of the plurality of check valves 48A-C may be seen in the associated drain assemblies 26A-C. For example, check valve 48A operates to prevent water flow from conduit 28 to chamber 24A in the following manner. FIG. 3 illustrates an exploded perspective view of an illustrative embodiment of check valve 48A, which exemplifies any of the plurality of check valves 48A-C. During operation check valve 48A is oriented with respect to gravity as shown by the gravity arrow 50. A float ball 52A is retained within a drain pipe 54A between a lower sieve plate 56A and an upper valve seat 58A so that, when hydraulic pressure at the bottom of chamber 24A exceeds the hydraulic pressure in conduit 28 (FIGS. 1-2), water flow urges float ball 52A away from valve seat 58A, thereby permitting water to flow downward through drain pipe 54A and through sieve plate 56A into conduit 28 (FIGS. 1-2). Should the hydraulic pressure in conduit 28 equal or exceed the hydraulic pressure at the bottom of chamber 24A, then check valve 48A closes to prevent any water flow in the upward direction because float ball 52A urges against valve seat 58A, thereby closing off all flow in drain pipe 54A. These elements of check valve 48A are suitable for simple and inexpensive manufacture for robust performance. For example, valve seat 58A and drain pipe 54A may be embodied as simple sections of PVC pipe, float ball 52A may be embodied as a simple rubber sphere (e.g., a ball), and sieve plate 56A may be embodied as a simple plastic drain sieve, for example.

Returning to FIG. 2, the hydraulic chamber independence feature of converter 10 is now described. From FIG. 2, it may be readily appreciated that the hydraulic head within conduit 28 generally approaches but cannot exceed the highest of the independent chamber hydraulic heads 57A-D within chambers 24A-D. Hydraulic heads 57A-D illustrated in FIG. 2 exemplify a snapshot of the relationship among chambers 24A-D typically resulting from the cumulative capture of water from various wave surges overtopping ramp 12 and encountering openings 22A-D (FIG. 1) and an unchecked flow of water from chamber 24D down and out through drain assembly 26D to conduit 28. Accordingly, check valve 48A is illustrated as operating to check water flow through drain assembly 26A from chamber 24A into conduit 28 because hydraulic head 57A (the water level) in chamber 24A is illustrated to be less than hydraulic head 57C (the highest chamber water level) within conduit 28. Similarly, check valve 48B is illustrated as operating to restrict water flow through drain assembly 26B from chamber 24B into conduit 28 because the water level (hydraulic head) in chamber 24B is illustrated to be less than the hydraulic head within conduit 28 but greater than the hydraulic head 57A in chamber 24A. Finally, check valve 48C is illustrated as fully open to permit unchecked water flow through drain assembly 26A from chamber 24A into conduit 28 because hydraulic head 57C (the water level) in chamber 24C is illustrated to be the highest chamber water level, which is equal to the hydraulic head in conduit 28 unless incoming wave surges fill chamber 24D. No check valve is required in drain assembly 26D for the final chamber 24D because the hydraulic head in chamber 24D is always equal to or less than the hydraulic head in conduit 28 and final chamber 24D operates as a surge chamber for the remaining chambers 24A-24C to moderate hydraulic head fluctuations and temporarily store water not immediately flowing through conduit 28 to turbine 46. The relatively large volume of chamber 24D contributes to the maintenance of a steady useable flow and generation of power therefrom.

From the above, it may be readily appreciated that the primary flow through conduit 28 results from the chamber having the highest hydraulic head (water level). As the highest-head chamber drains and approaches the head of neighboring independent chambers, these begin to flow into conduit 28, thereby maintaining the water flow through turbine 46 necessary for effective power generation. As illustrated in FIG. 2, unchecked chamber 24D is prevented from flowing only by the back-pressure from conduit 28 from the higher hydraulic head 57C in chamber 24C. As hydraulic head 57C falls, hydraulic head 57B begins to flow, followed by hydraulic head 57D, and finally by hydraulic head 57A. This staged capture and flow procedure exemplifies the operation of converter 10. Because chambers 24A-D are disposed in substantial alignment with horizontal surge component 20 (FIG. 1) and openings 22A-D are disposed at different elevation along vertical wave surge component 18, each chamber 24A-D will capture water from certain wave surges and not from others; but the staged capture and flow operation ensures a steady useable generation of power therefrom. Because turbine power output increases exponentially with the hydraulic head and flow rate, converter 10 is suitable for operation at low hydraulic pressure differences and high flow rates. This is advantageous because the mass and velocity of incoming wave surges tends to limit available hydraulic head but flow volume is limited only by the scale of converter 10, which may be scaled up in either horizontal dimension to any useful size and number of isolated chambers.

FIG. 4 illustrates a front view of converter 10, showing the entire embodiment of grill 38 and detail FIG. 4A illustrates a cross-sectional view of a useful embodiment of slat 40, showing the upper surface 60 to be larger than the lower surface 62. This trapezoidal cross-section facilitates trash rejection without significant reduction of water capture when slats of this cross-section are arrayed to form grill 38. Moreover, the narrow separations urge the incoming wave surge water further up ramp 12 before capture, thereby converting a significant amount of the horizontal surge kinetic energy component 20 into potential energy in the form of elevated hydraulic head. This improved conversion of horizontal kinetic energy into stored potential energy is an important feature of the converter 10. Although ramp 12 is illustrated as having a single linear slope from end to end, an alternative ramp embodiment (not shown) having a concave or convex curved surface whose elevation varies non-linearly from end to end may be useful for optimizing kinetic to potential energy conversion in various alternative ocean conditions.

During operation, as described above, converter 10 continuously captures and converts the surge kinetic energy component into stored hydraulic head. This stored potential energy is then converted to electrical energy by releasing the stored water through closed low-head turbine 46. The combined storage volume of independent chambers 24A-D is balanced with the flow rate exiting from draft tube 32 to facilitate continuous stable rotation of closed low-head turbine 46 and the coupled electrical generator 36, thereby providing a steady supply of electrical power from episodic wave surges.

The theoretical relationship between the surge kinetic energy KE in joules and the resulting stored potential energy PE in joules (assuming lossless conversion) is expressed by the following:

$$KE = m \cdot v^2/2 = m \cdot g \cdot h = PE \quad \text{[Eqn. 1]}$$

where:
m=Mass of incoming surge water (kg),
v=Surge water velocity (m/s),
g=Gravitational constant (m/s$^2$), and
h=Available hydraulic head (m).

Eqn. 1 demonstrates that hydraulic head h varies directly with the square of surge water velocity v, making the faster wave surge a more useful source of energy. During operation of converter 10, surge kinetic energy is converted to potential energy because surge water rushes up grill 38 before draining down into one or more independent chambers 24A-D. Water held in each chamber is isolated hydraulically from the other chambers by check valves 48A-C, which together facilitate a generally evacuated (entrainment air-free) and continuous supply of seawater to turbine 46. Independent chambers 24A-D operate to maintain a full flow in conduit 28 by providing a staged reserve supply during wave surge "dry spells." Turbine 46 rotates responsive to the flow of water from conduit 28 through draft tube 32 and into ambient ocean 30. Draft tube 32 extends downward to preserve a siphon (suction) head when ocean surface 14 drops below the base of turbine 46, which contributes to the aggregated hydraulic head powering turbine 46 and thus to the resulting output power from generator 36. The exit of draft tube 32 must remain submerged to maintain siphon head.

Available converter output power is expressed by the following:

$$P = Q \cdot h \cdot n / C \quad \text{[Eqn. 2]}$$

where:
P=Power delivered by the turbine (W)
Q=Mass flow rate through the turbine (kg/s)
h=Available hydraulic head.(m)
n=Turbine efficiency (%), and
C=Unit conversion factor.

Eqn. 2 demonstrates that turbine output power P varies directly with hydraulic head h and mass flow rate Q. Accordingly, converter 10 operates at high mass flow rates to produce useful power from low hydraulic heads. The available hydraulic head h is limited by the mass and velocity of the incoming wave surges and mass flow rate Q is limited by the scale of conduit 28 and chambers 24A-D; that is, by the scale of the structure of converter 10.

FIG. 5 illustrates a rear view of converter 10, with the tail-wall removed to show the interior of final chamber 24D and other elements of converter 10 described above in connection with FIGS. 1-4. Note that draft tube 32 has a submerged exit, which should be disposed to ensure that the siphon lock between draft tube 32 and ambient ocean 30 is not lost during normal wave action.

FIG. 6A illustrates a side view of an alternative wave surge power converter apparatus embodiment 100 showing the plurality of drain assemblies 126A-D and exemplary dispositions of the check valves 148A-C during normal flow conditions, which occur when ocean surface 14 remains below the highest of the independent chamber hydraulic heads 157A-D while remaining above the exit of the draft tube 132 to maintain siphon head through the turbine 146. Converter 100 includes a shaft 134 for coupling turbine 146 to a generator 136 but also provides an additional reversible transmission 166 to facilitate uninterrupted power conversion during backflow conditions that are now described.

Backflow conditions may arise whenever the ocean surface 114 rises and remains above one or more of independent chamber hydraulic heads 157A-D so that water is urged up through the draft tube 132, backing up through turbine 146, and into the conduit 128. Backflow operation should not be necessary for most ocean conditions, but converter embodiment 100 is now described as a useful solution to operations in ocean surf states leading to occasional backflow conditions.

FIG. 6B is a diagram illustrating a side view wave surge power converter 100 showing illustrative dispositions of check valves 148A-C during abnormal backflow conditions that may arise when ocean surface 114 is elevated above the highest one of independent chamber hydraulic heads 157A-D. During operation, significant backflow up draft tube 132 and turbine 146 causes turbine 146 to reverse direction and rise up, thereby lifting shaft 134 to effect a gear shift in transmission 166, thereby preventing a polarity reversal in generator 136.

FIGS. 7A-B are two top view illustrations of transmission 166 suitable for use with converter 100 the two flow conditions illustrated in FIGS. 6A-B. FIG. 7A illustrates the gearing arrangement for normal down-flow operation (FIG. 6A) wherein shaft 134 turns clockwise, an idler gear 170 turns counterclockwise, and the generator shaft 172 turns clockwise. A ratchet-type mechanism (not shown) may be provided to limit generator shaft 172 to clockwise rotation, for example. FIG. 7B illustrates the gearing arrangement for backflow or up-flow operation (FIG. 6B) wherein shaft 134 turns counter-clockwise, a first idler gear 170A turns clockwise, a second idler gear 170B turns counter-clockwise, and generator shaft 172 turns clockwise. The backflow also lifts the turbine gear on shaft 134 to facilitate its engagement with idler gear 170A, which is located above idler gear 170 to form, for example, the two-level transmission 166 illustrated in FIGS. 6A-B. When turbine gear at shaft 134 rises, it disengages from the normal flow gears in FIG. 7A and engages the backflow gears in FIG. 7B. Using two idler gear levels permits generator gear at shaft 172 to rotate counter-clockwise under all flow conditions.

As may be readily appreciated from the above description, this wave surge power converter embodiment offers several advantages. For example, other than the turbine and generator elements all converter elements may be embodied to include only concrete, PVC, rubber and neoprene. Such inexpensive and corrosion-resistant materials are well-adapted for this marine application and even better suited to fresh water applications having significant wave surges, such as the shorelines of the Great Lakes.

The preferred vertical orientation of the walls separating each of the horizontal array of independent chambers 24A-D facilitates the capture of the smaller available increments of potential energy, such as a single foot of hydraulic head. A vertical array of horizontal chambers disadvantageously requires larger hydraulic head differentials and cannot capture the smaller potential energy increments available in many surf conditions. For example, the horizontal chambers disclosed in the above-cited Anderson reference (U.S. Pat. No. 7,040,089) cannot capture significant energy from wave surges of less than two feet. Moreover, instead of the multiple load-bearing floors required for a vertical array of horizontal chambers, a single load-bearing chamber floor is sufficient for this converter embodiment. Similarly, instead of the disadvantageously large amount of air entrainment experienced with a vertical array of horizontal chambers as draining water powers a turbine, this converter embodiment entrains a minimal amount of air in water passing through drain assemblies 26A-D, plenary conduit 28, turbine 46 and out draft tube 32 to the ambient ocean 30.

During operation of this converter embodiment, hydraulic head is not lost to backflow as it is in a horizontal chamber array, for example, when a new wave fills a lower horizontal chamber while it is also receiving drainage from an upper chamber. This feature of a vertical array of horizontal chambers causes overtopping of the lower chamber; thereby losing captured potential energy to the surrounding ocean.

During operation of this converter embodiment, large volumes of water are reserved in independent chambers and remain available to buffer the continuous flow of water to the conduit and the turbine necessary for stable power output; even during a prolonged intermission (dry spell) between wave surges.

Figures 8, 8A:
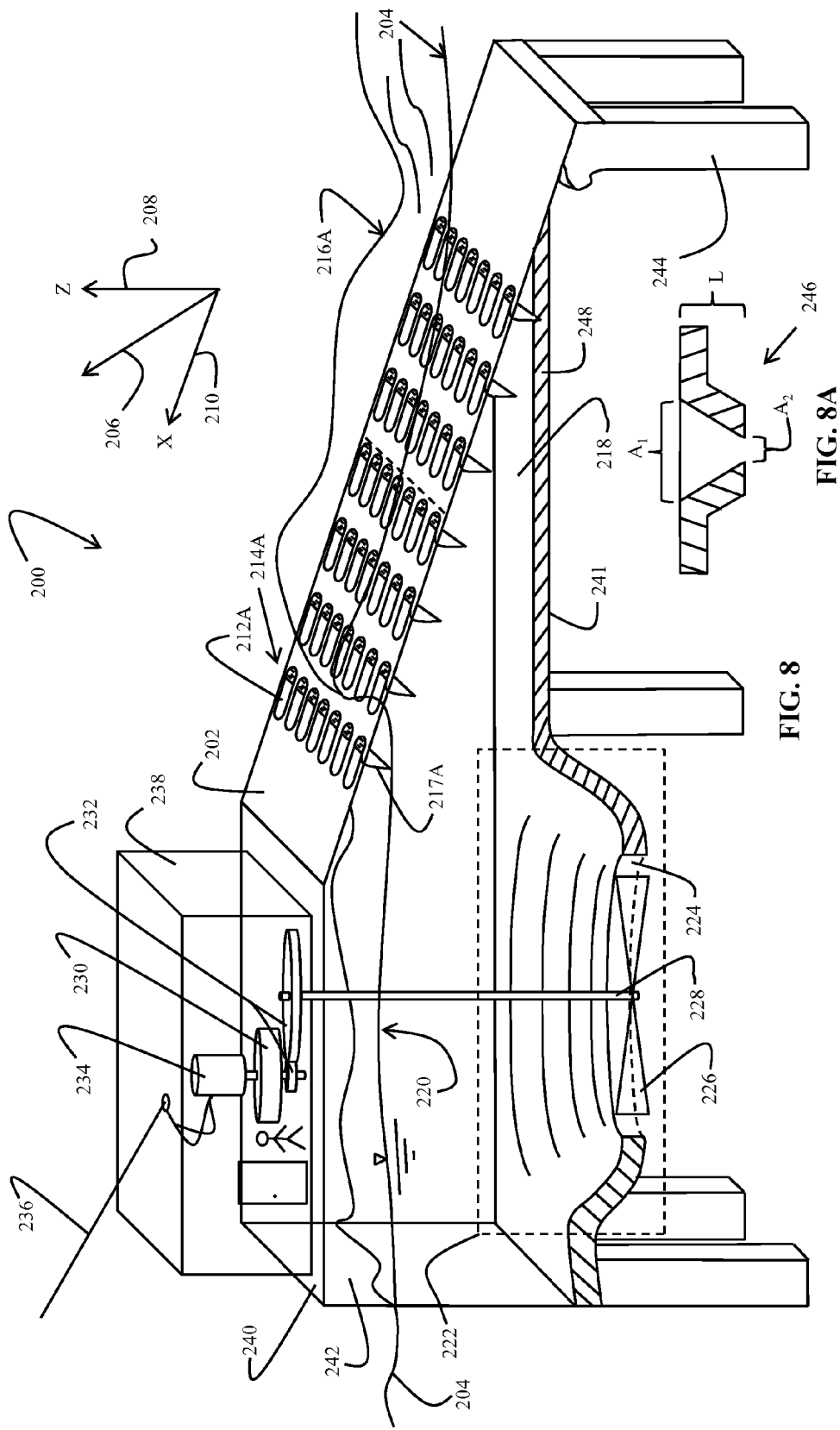
FIG. 8, including detail
FIG. 8A, is a diagram illustrating a perspective view of a preferred "wedge" embodiment of a wave surge power converter apparatus of this invention in operation during a wave surge peak.
Figure 9:
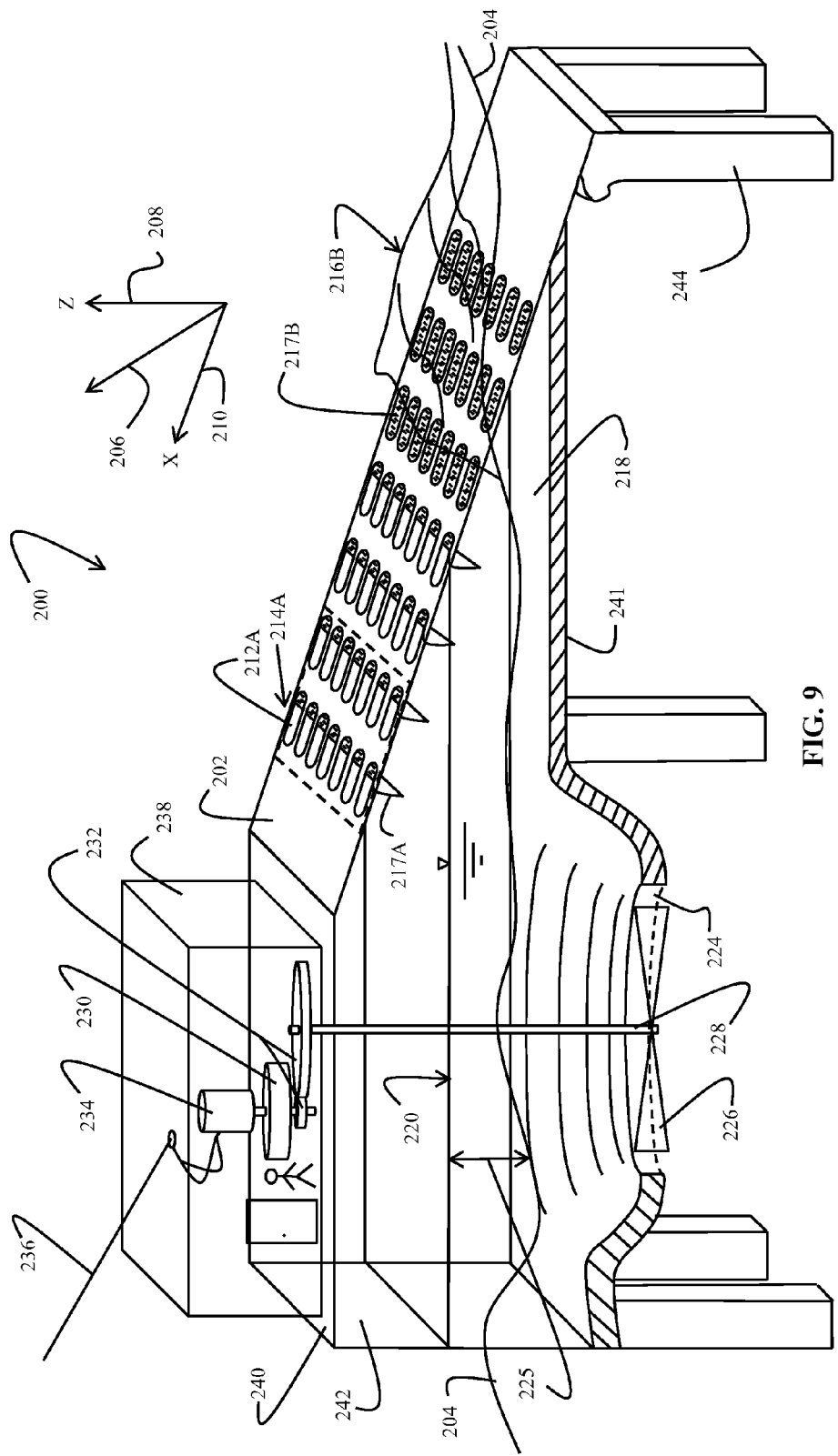
FIG. 9 is a diagram illustrating a perspective view of the embodiment of FIG. 8 in operation during a wave surge trough.

FIGS. 8-9 illustrate a preferred "wedge" wave surge power converter embodiment 200 of this invention adapted for use in sea shore and littoral environments and employing principles similar to those described above, showing the inclined ramp 202. During operation, converter 200 is preferably disposed at an ocean surface 204 having episodic wave surges generally oriented in the direction indicated by the arrow 206 such that a typical wave surge 216A moves generally along the vertical surge component 208 and generally along the horizontal surge component 210. Ramp 202 is shown with an exemplary fixed slope of about 33% (17-18 degrees) and is preferably oriented generally along surge direction 206 such that the wave surge water moves up ramp 202, progressing along a series of rows of openings exemplified by the opening 212A and the row 214A, which together are disposed to function as a grill. Each row of openings is fitted with a check valve embodied as, for example, a float valve flap exemplified by the float valve flap 217A in row 214A (see FIGS. 10A-C for detail) that operates to permit wave surge water entry into the storage chamber 218 while blocking the exit of water from storage chamber 218. Each of openings exemplified by opening 212A that are exposed to the wave surge 216A (FIG. 8) then receives surge water into the storage chamber 218. But each of float valve flaps that are exposed to captured water in storage chamber 218, exemplified by float valve flap 217B (FIG. 9), is floated up to cover the corresponding openings and block the escape of captured water during wave relaxation 216B. The spacing between the rows and the openings within each row serves to block entry of floating debris into storage chamber 218 and to facilitate sloughing of trapped debris back into the surf during wave relaxation 216B (FIG. 9).

As may be readily appreciated from this description, the captured surge water 220 within storage chamber 218 flows down by gravity through the discharge duct assembly 222 (FIG. 8) and out the exit 224 into the ambient ocean 204. This flow of captured water 220 from storage chamber 218 through discharge duct assembly 222 and out exit 224 arises from the hydraulic pressure difference 225 (FIG. 9) between storage chamber 218 and ambient ocean 204 and may be employed to turn a low-head turbine 226 that is disposed within discharge duct assembly 222 and is coupled by means of, for example, a shaft 228 to, for example, a flywheel 230 that is further coupled by, for example, a geared transmission assembly 232 to a generator 234 for generating electrical power for transmission over a transmission line 236 to a remote power grid (not shown). The various generating elements may be housed in a generator house 238 disposed on a base support 240 above the rear wall 242 of converter 200, for example. Converter 200 may be disposed on a number of pylons exemplified by the pylon 244.

Discharge duct assembly 222 includes a discharge duct 246 (FIG. 8A), which has a cross-sectional flow area (A) and a length (L). For example, as shown in FIG. 8A, discharge duct 246 has a cross-sectional flow area (A) that varies (reduces) monotonically from $(A_1)$ to $(A_2)$ over the duct length (L). The particular variation of the cross-sectional flow area (A) over the length (L) of discharge duct 246 is an important feature of converter 200 for reasons that are described in more detail below in connection with FIGS. 12-13. Another important feature of converter 200 is the inclined ramp 202, which operates to capture and convert incoming horizontal kinetic energy (velocity head) to potential energy (hydraulic head or depth of captured water 220) stored within the structure. Because of this important feature of converter 200, the interior head of captured water 220 exceeds the exterior head of ambient ocean surface 204 and it is primarily this hydraulic pressure difference 225 that drives the low-head turbine 226 (see the discussion of FIGS. 12-13 below). Another important feature of converter 200 is the spacing between rows and the openings within each row of openings in inclined ramp 202, which are disposed to prevent most floating debris from entering storage chamber 218 by facilitating the sloughing of debris back into the surf during the relaxation of the wave surges.

Converter embodiment 200 offers several advantages. The lack of interior walls in storage chamber 218 increases its storage capacity, minimizes interior wall maintenance (e.g., scraping barnacles) and permits the use of a larger diameter for low-head turbine 226. The float valve embodiment exemplified by float valve flap 217B (FIG. 9) minimizes valve friction head loss, thereby increasing the hydraulic head 225, which increases the output power proportionately with the hydraulic head raised to the three-halves power; [generator power] is proportional to [turbine head]$^{3/2}$ Because the interior head 220 of the captured surge water is uniform throughout storage chamber 218, low-head turbine 226 may be disposed anywhere in the base 241 without loss of output power. In fact, base 241 provides room to dispose several low-flow turbines (not shown) operating under the same head, thereby optimizing output power, which is proportional to the total turbine area.

Figure 10:
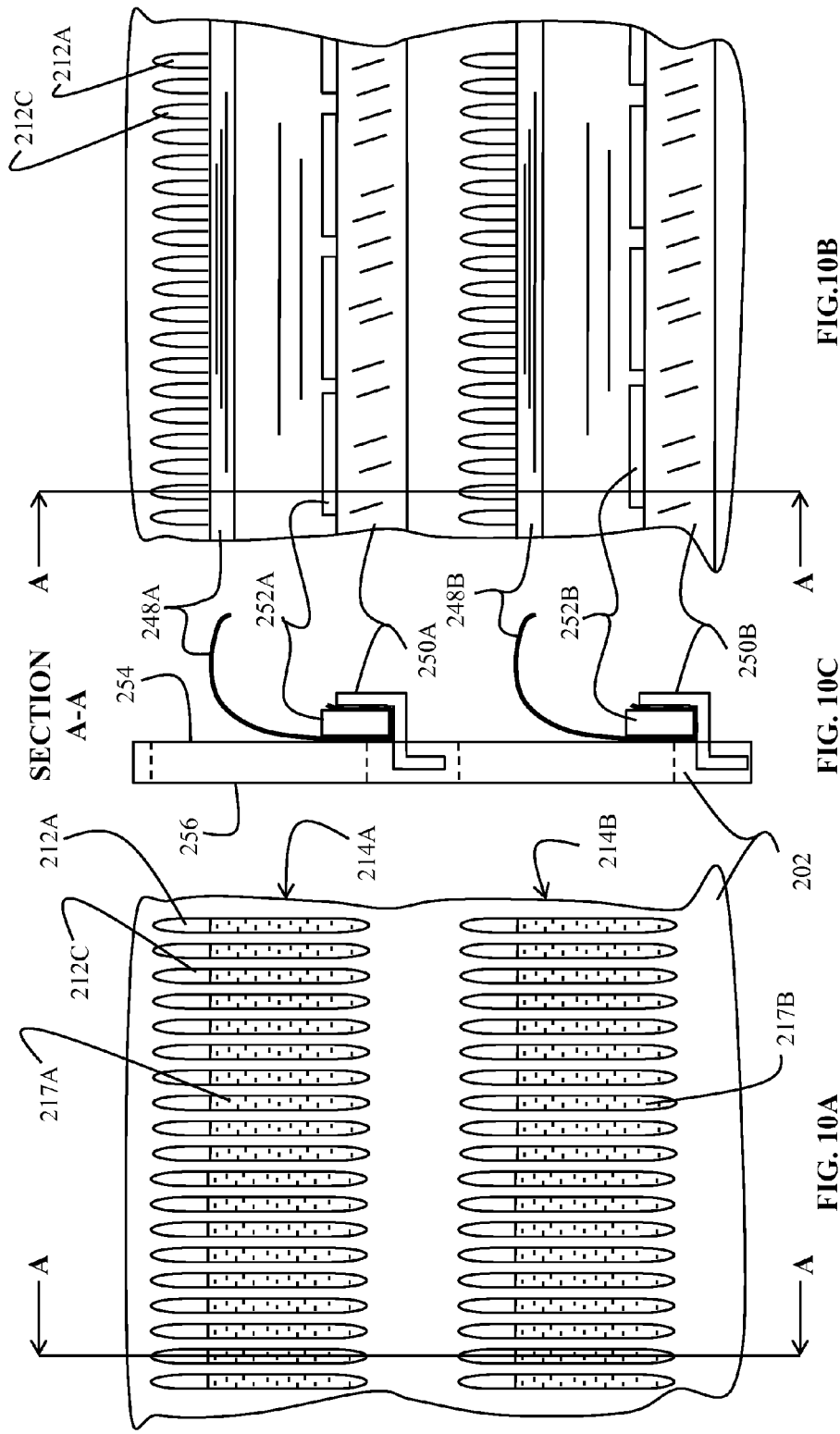
FIG. 10A is a schematic diagram illustrating a partial top view of the embodiment of FIG. 8 revealing a plurality of ramp openings.
FIG. 10B is a schematic diagram illustrating a partial bottom view of the ramp surface of FIG. 10A revealing a plurality of check valve flaps.
FIG. 10C is a cross-sectional view of the ramp surface of FIG. 10A at A-A revealing the ramp openings and check valve flaps in cross-section.

FIG. 10A is a schematic diagram illustrating a partial top view of inclined ramp 202 that shows the rows of openings exemplified by the opening 212A and the row 214 described above. FIG. 10B provides the bottom view of the ramp surface of FIG. 10A to reveal a plurality of check valve flaps 217A-B. FIG. 10C is a cross-sectional view (A-A) of the ramp surface of FIGS. 10A-B that reveals the detail of check valve flaps 217A-B in their open disposition. Each check valve 217 includes a float flap 248 that is retained by a float valve mounting bracket 250 by means of, for example, a retaining brick 252, all of which extend along the respective row of openings. Float flap 248A is sufficiently buoyant to cover all openings in row 214A when it is urged up against the underside 254 of inclined ramp 202 by the water trapped within storage chamber 218 (FIGS. 8-9) and sufficiently flexible to permit unobstructed flow of surge water into storage chamber 218 from the top side 256 of inclined ramp 202. The preferred interior slope (not shown) of base 241 toward discharge duct 246 depends on local conditions influencing sediment and debris loading. Heavy loading requires a base (not shown) with the interior floor sloped towards the discharge duct, and light loading does not.

Figure 11:
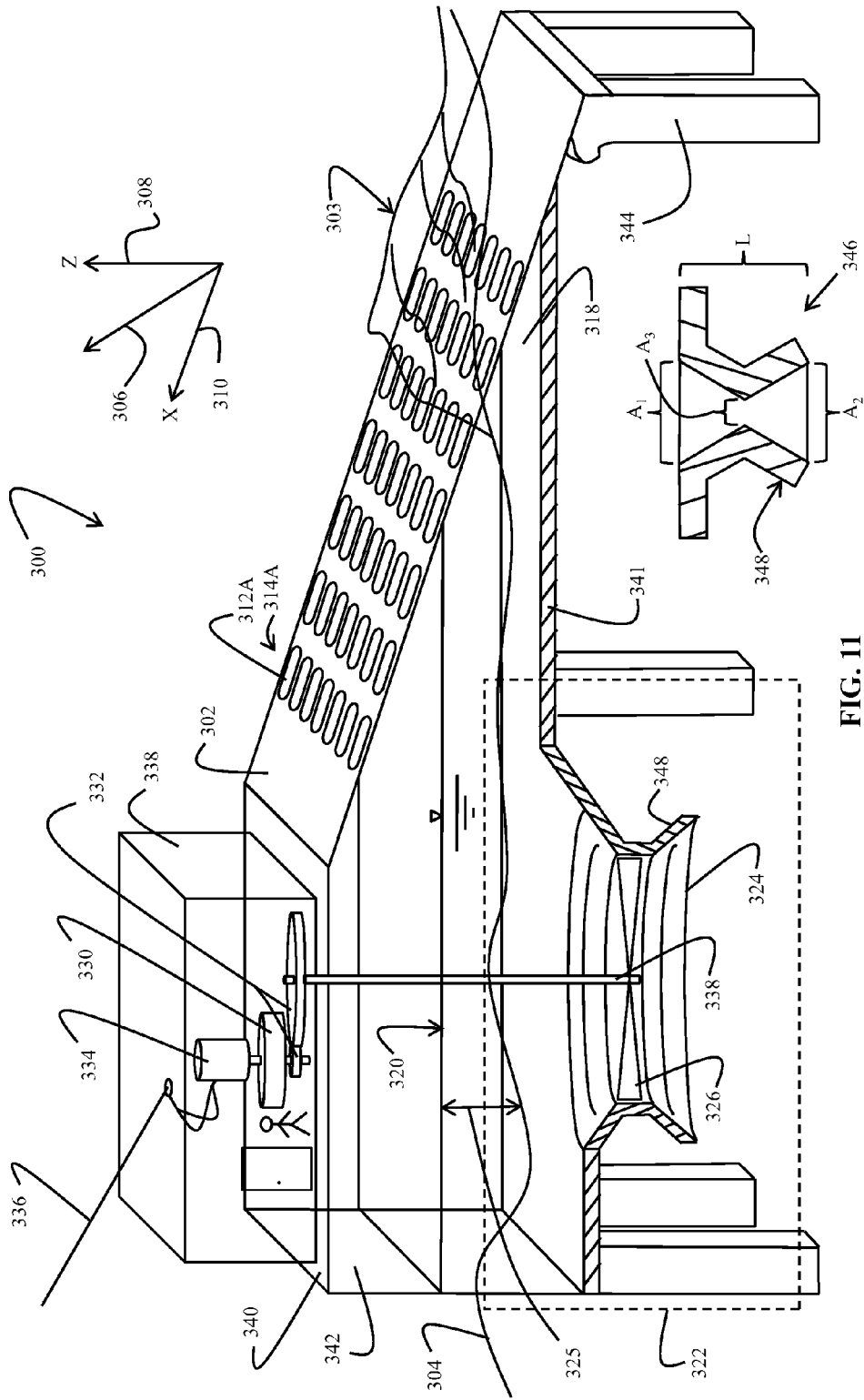
FIG. 11, including detail

FIG. 11 illustrate a preferred "wedge" river flow power converter embodiment 300 of this invention adapted for use in riverine environments and employing principles similar to those described above, showing the inclined ramp 302. During operation, converter 300 is preferably disposed at an upstream river surface 303 characterized by a rapid continuous horizontal flow component 310 such that some part of the horizontal flow component 310 is redirected vertically as a vertical surge component 308 to provide a net flow energy directed generally along the direction indicated by the arrow 306. Ramp 302 is shown with an exemplary fixed slope of about 33% (17-18 degrees) and is preferably oriented generally along flow surge direction 306 such that the flow surge water moves up ramp 302, progressing along a series of rows of openings exemplified by the opening 312A in the row 314A, which together are disposed to function as a grill. Each of openings exemplified by opening 312A that are exposed to the flow surge 306 then receives flow water into the storage chamber 318. These rows of openings do not require check valves because upstream flow and its associated pressure on the captured flow water 320 are generally constant and unlikely to permit the return of captured flow water 320 to the up-stream river surface 304. Converter 300 is adapted for operation in a fast-moving river or creek. For operation in a slow moving river, some additional provision (not shown) is preferred for spanning the waterway in a manner that creates an upstream-to-downstream head differential sufficient to emulate a more rapidly moving stream. Water moving past inclined ramp 302 at 8 mph (3.6 m/s) should provide a net hydraulic pressure difference 325 of about two feet (equivalent to hydrostatic pressure of about 6 kN/m$^2$), which should be sufficient to overcome converter drive train friction losses to provide constant power output. The exterior upstream river surface water pressure at 303 generally balances the interior water pressure 320 at inclined ramp 302 because the exterior river velocity head pressure at each of the openings (exemplified by opening 312A) operates as a check valve by retaining the captured flow water 320 within the storage chamber 318 at a height greater than the downstream ambient river surface 304, thereby providing a hydraulic pressure difference 325 suitable for conversion to electrical power. The spacing between the rows and the openings within each row serves to block entry of floating debris into storage chamber 318 and to facilitate sloughing of trapped debris back into the river.

As may be readily appreciated from this description, the captured flow water 320 within storage chamber 318 flows down by gravity through the discharge duct assembly 322 and out the exit 324 into the downstream ambient river 304. This flow of captured water 320 from storage chamber 318 through discharge duct assembly 322 and out exit 324 arises from the hydraulic pressure difference 325 between storage chamber 318 and downstream ambient river 304 and may be employed to turn a low-head turbine 326 that is disposed within discharge duct assembly 322 and is coupled by means of, for example, a shaft 328 to, for example, a flywheel 330 that is further coupled by, for example, a geared transmission assembly 332 to a generator 334 for generating electrical power for transmission over a transmission line 336 to a remote power grid (not shown). The various generating elements may be housed in a generator house 338 disposed on a base support 340 above the rear wall 342 of converter 300, for example. Converter 300 may be disposed on a number of pylons exemplified by the pylon 344.

Discharge duct assembly 322 includes a discharge duct 346 (FIG. 11A), which has a cross-sectional flow area (A) and a length (L). For example, as shown in FIG. 11A, discharge duct 346 has a cross-sectional flow area (A) that varies from $(A_1)$ to $(A_2)$ over the duct length (L), first narrowing to a minimum $(A_3)$ in the vicinity of turbine 338 and then flaring to $(A_2)$ and forming a turbine shroud 348 extending below turbine 338. The particular variation of the cross-sectional flow area A over the length L of discharge duct 346 is an important feature of converter 300 for reasons that are described in more detail below in connection with FIGS. 12-13. Another important feature of converter 300 is the inclined ramp 302, which operates to capture and convert incoming horizontal kinetic energy (velocity head) to potential energy (hydraulic head or depth of captured water 320) stored within the structure. Because of this important feature of converter 300, the interior head of captured water 320 exceeds the exterior head of river surface 304 and it is primarily this hydraulic pressure difference 325 that drives the low-head turbine 326 (see the discussion of FIGS. 12-13 below). Another important feature of converter 300 is the spacing between rows and the openings within each row of openings in inclined ramp 302, which are disposed to prevent most floating debris from entering storage chamber 318 by facilitating the sloughing of debris back into the river.

Converter embodiment 300 offers several advantages. The lack of interior walls in storage chamber 318 increases its storage capacity, minimizes interior wall maintenance and permits the use of a larger diameter for low-head turbine 326. Because the interior head 320 of the captured surge water is uniform throughout storage chamber 318, low-head turbine 326 may be disposed anywhere in the base 341 without loss of output power. In fact, base 341 provides room to dispose several low-flow turbines (not shown) operating under the same head, thereby optimizing output power, which is proportional to the total turbine area. The preferred interior slope (not shown) of base 341 toward discharge duct 346 depends on local conditions influencing sediment and debris loading. Heavy loading requires a base (not shown) with the interior floor sloped towards the discharge duct, and light loading does not.

Power output from low-head turbine 326 increases proportionately with the net difference between interior pressure head (level) of captured flow water 320 and the pressure head localized at exit 324 beneath turbine 326. If turbine shroud 348 is extended below the base 341 and the local river flow velocity is fast and parallel to the base, the resulting venturi effect reduces local fluid pressure and thereby increases the effective hydraulic pressure difference 325 and the resulting net converter output power for the reasons now described.

Bernoulli's Principle says that increased local fluid velocity produces decreased local fluid pressure, as is well-known in the hydraulic arts. Bernoulli's incompressible flow equation can be written as follows:

$$\left(\frac{P_1}{\gamma} + z_1 + \frac{v_1^2}{2g}\right) = \left(\frac{P_2}{\gamma} + z_2 + \frac{v_2^2}{2g}\right) \quad \text{[Eqn. 3]}$$

where:
P=local fluid pressure in N/m² (kg/m/s²);
$\gamma = \rho g$ in kg/m²/s²;
$\rho$=fluid mass density in kg/m³;
g=9.80665 m/s²;
v=local fluid velocity in m/s;
$P/\gamma$ is the pressure head in meters;
z is the elevation head in meters; and
$v^2/2g$ is the velocity head in meters.

Head is energy per unit weight and, because energy has units of Newton-meters, head has length units. Pressure head is the energy per unit weight stored in the fluid pressure. Elevation head is the potential energy per unit weight stored in the fluid elevation. Velocity head is the kinetic energy per unit weight stored in the fluid speed and direction. Eqn. 3 is valid only when the fluid is incompressible so that even though pressure varies, the density is constant and there are no local viscous forces, such as occur in the boundary layer.

Eqn. 3 suggests that the exit water velocity head increases as the exit flow velocity increases while passing through the narrowing exit throat, which is offset by a pressure head reduction to balance Bernoulli's equation. The increased velocity head provides an increase in turbine output power (which is related to fluid velocity) over that available from the same pressure and elevation head with no venturi effect. This effect is enhanced in situations where the external water is moving rapidly across the conduit exit such as may be expected in the river embodiment of FIG. 11. Slightly enlarging the internal diameter of discharge conduit 346 from A3 to A2 decreases counterproductive upwelling pressure head on the turbine in a manner analogous to the draft tube 32 of FIG. 5.

Figure 12:
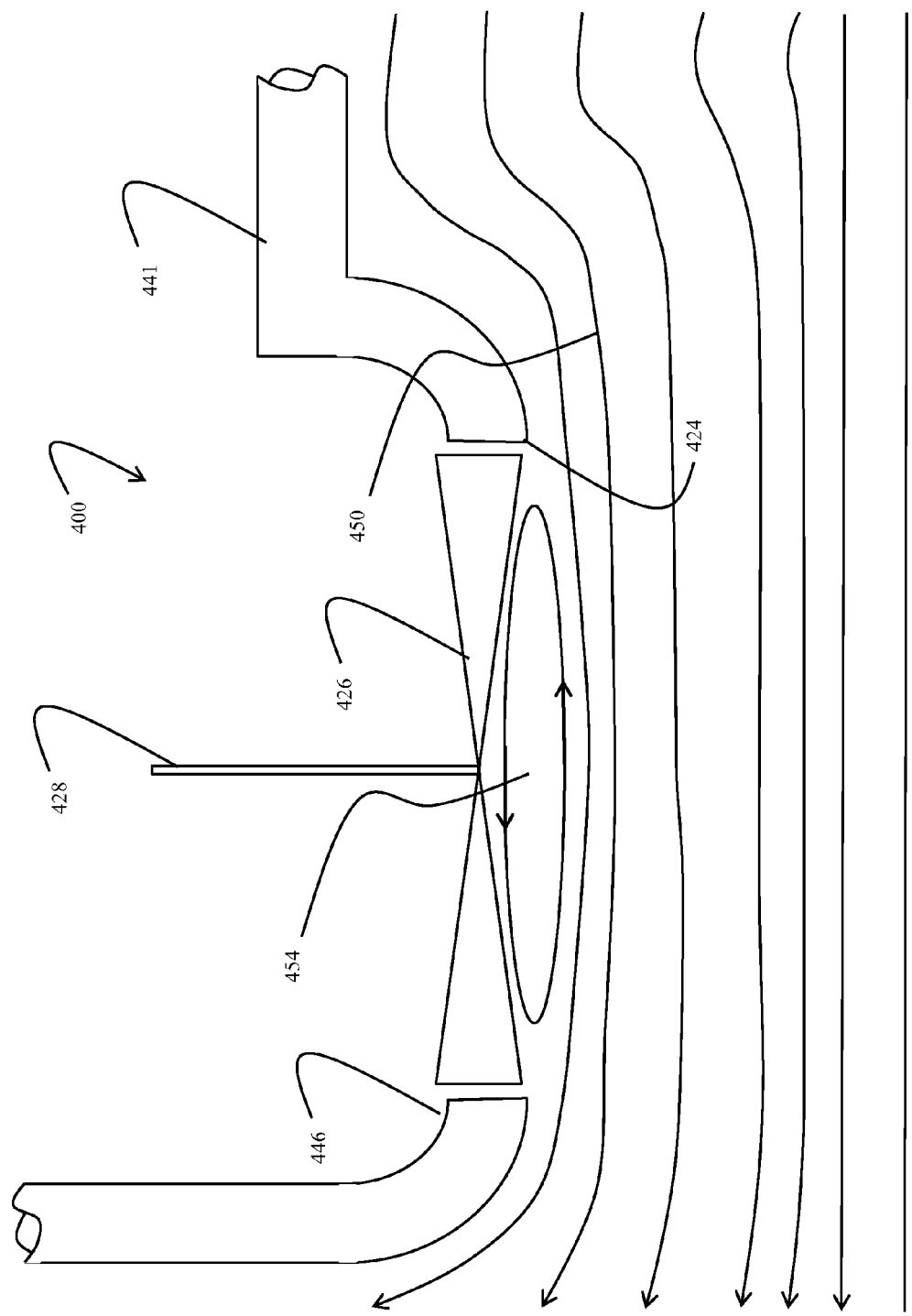
FIG. 12 is a schematic diagram illustrating the principle of operation of a preferred controlled-flow duct embodiment of this invention.

FIG. 12 is a schematic diagram illustrating the principle of operation of a preferred controlled-flow duct embodiment 400 of this invention, showing the shaped discharge duct 446 and the base 441 disposed in the flowing water 450. Shaped discharge duct 446 increases the horizontal and lateral water velocity (velocity head) beneath the turbine 426 in the venturi eddy 454. As velocity head increases, Eqn. 3 demands a corresponding reduction in that exterior local pressure head beneath turbine 426 in the venturi eddy 454. As upwelling pressure decreases in eddy 454, the internal net pressure head (225 in FIGS. 9 and 325 in FIG. 11) increases proportionately, forcing more captured water through discharge duct 446 and out the exit 424. This increased power turns turbine 426 and is transferred through the shaft 428 to the generator house (not shown). Output power is greater than that available from the captured flow water pressure head alone, which is an important advantage of controlled-flow duct embodiment 400 because power output (P) from a turbine diameter (D) increases exponentially with the internal net pressure head (H) at turbine 426 according to the equation $P = CD^2 H^{1.5}$ where C is a fixed conversion factor. The venturi effect at eddy 454 may also be created by simply extending a discharge duct 346 (FIG. 11) below base 341 to form a turbine shroud 348 (FIG. 11A). Responsive to the velocity of water flow 450, a low pressure zone forms immediately downstream of the shroud lip (not shown). The cross-sectional area (A) does not have to vary over any of the discharge conduit length (L) to enjoy this benefit but sloping the base interior towards the discharge outlet promotes the suspension, transport, and expulsion of sediment and debris out of the structure and is preferred. Turbine shroud 348 (FIG. 11) is preferably disposed sharply below base 341 to enhance the resulting pressure drop and power benefit.

Figure 13:
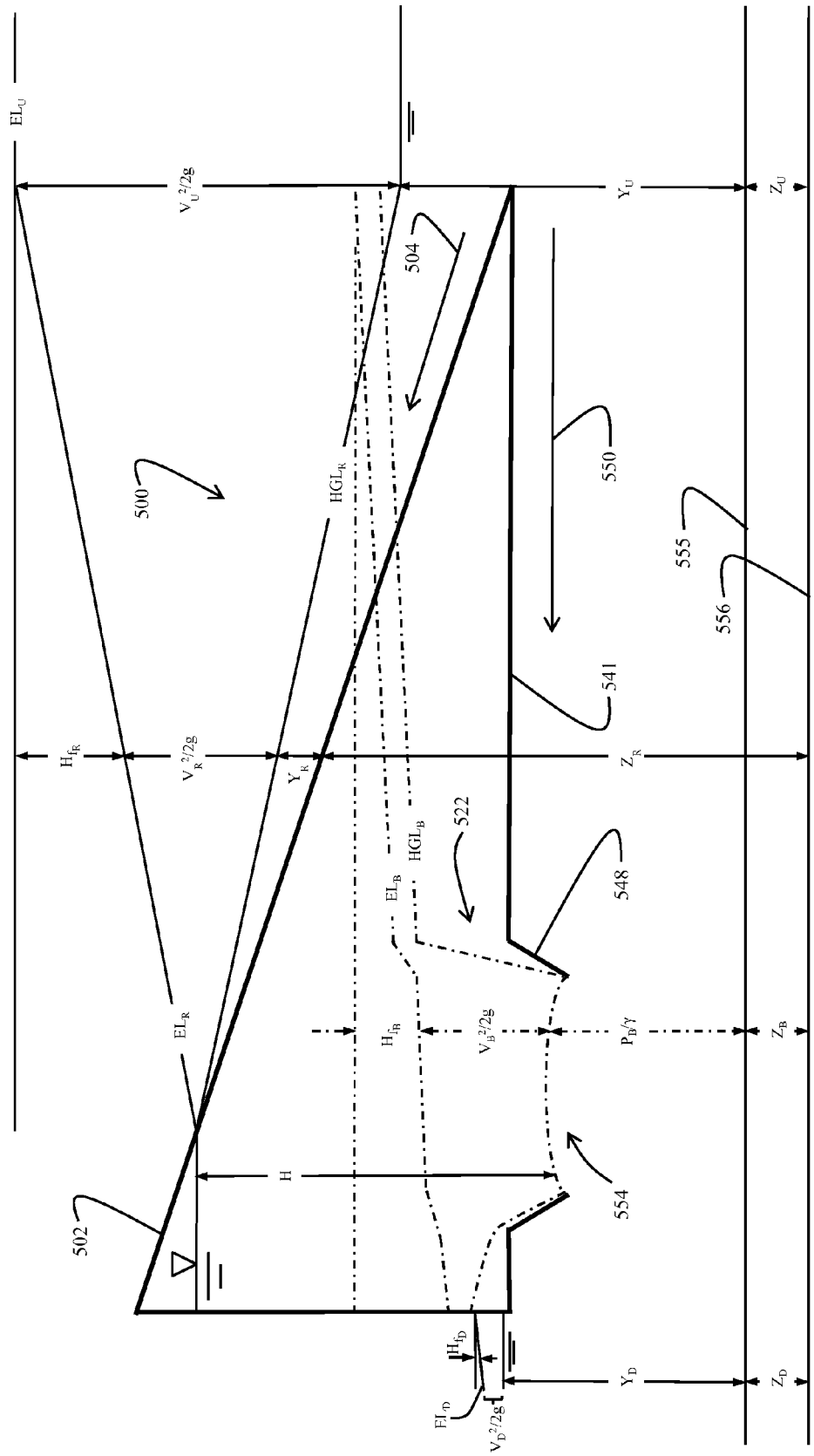
FIG. 13 is a schematic diagram illustrating the principle of operation of another preferred controlled-flow duct embodiment of this invention showing detailed references to the elements of Bernoulli's equation.

FIG. 13 is a schematic diagram of the wedge converter 500 of this invention illustrating the energy distribution. FIG. 13 shows the water flow 504 up the ramp 502 and the ambient flow 550 below the base 541 and the discharge duct assembly 522. The venturi (low pressure) effect occurs at the eddy 554 that forms below the turbine shroud 548 responsive to the velocity of water flow 550. The sea floor or river bottom 555 is represented by a horizontal line, with the datum 556 below that for referencing elevation head. The symbols used in FIG. 13 are defined herein as follows:

$EL_D$=downstream energy line;
$H_{fD}$=downstream friction head;
$V_D^2/2g$=downstream velocity head;
$Y_D$=downstream depth;
$Z_D$=downstream elevation head;
H=net internal head;
$EL_R$=ramp energy line;
$H_{fR}$=ramp friction head;
$V_R^2/2g$=ramp velocity head;
$Y_R$=ramp depth;
$Z_R$=ramp elevation head;
$HGL_R$=ramp hydraulic grade line;
$H_{fB}$=base friction head;
$V_B^2/2g$=base velocity head;
$P_B/\gamma$=base pressure head;
$Z_B$=base elevation head;
$EL_B$=base energy line;
$HGL_B$=base hydraulic grade line;
$EL_U$=upstream energy line;
$V_u^2/2g$=upstream velocity head;
$Y_U$=upstream depth; and
$Z$=upstream elevation head.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A wave surge power converter comprising:
a plurality of openings each disposed on an incline at an elevation to receive wave surge water when a wave surges up the incline;
a storage chamber coupled to one or more of the ramp openings for capturing wave surge water received thereby and retaining the captured water;
within one or more of the ramp openings, a check valve disposed to permit water flow into the storage chamber responsive to a hydraulic pressure difference across the check valve;
a discharge duct defining a cross-sectional flow area (A) and having a length (L) disposed to hydraulically couple the storage chamber to an exit; and a generator for producing electrical power from a flow of captured water in the discharge duct arising from a hydraulic pressure difference between the storage chamber and the discharge duct exit.

2. The wave surge power converter of claim 1 wherein the discharge duct cross-sectional flow area (A) varies over at least part of the discharge duct length (L).

3. The wave surge power converter of claim 2 wherein the discharge duct cross-sectional flow area (A) varies monotonically over at least part of the discharge duct length (L).

4. The wave surge power converter of claim 3 wherein the discharge duct exit is disposed such that the hydraulic pressure difference between the storage chamber and the discharge duct exit operates to prevent substantial water flow into the storage chamber from the discharge duct exit.

5. The wave surge power converter of claim 3 wherein the plurality of openings are disposed to prevent at least some floating debris from entering the storage chamber, thereby promoting conversion of surf kinetic energy to potential energy embodied at least in part as a hydraulic pressure difference.

6. The wave surge power converter of claim 3 wherein the opening elevation varies non-linearly with respect to the relative disposition of the opening along the direction of wave surge.

7. The wave surge power converter of claim 3 wherein the generator further comprises:
a closed low-head turbine disposed within the discharge duct to rotate responsive to water flow through the discharge duct; and
an electrical generator coupled to the low-head turbine such that the electrical generator produces electrical power responsive to rotation of the low-head turbine.

8. The wave surge power converter of claim 1 wherein the plurality of openings are disposed to prevent at least some floating debris from entering the storage chamber, thereby promoting conversion of surf kinetic energy to potential energy embodied at least in part as a hydraulic pressure difference.

9. The wave surge power converter of claim 8 wherein the generator further comprises:
a closed low-head turbine disposed within the discharge duct to rotate responsive to water flow through the discharge duct; and
an electrical generator coupled to the low-head turbine such that the electrical generator produces electrical power responsive to rotation of the low-head turbine.

10. The wave surge power converter of claim 1 wherein the discharge duct exit is disposed such that the hydraulic pressure difference between the storage chamber and the discharge duct exit operates to prevent substantial water flow into the storage chamber from the discharge duct exit.

11. The wave surge power converter of claim 1 wherein the opening elevation varies non-linearly with respect to the relative disposition of the opening along the direction of wave surge.

12. The wave surge power converter of claim 1 wherein the generator further comprises:
a closed low-head turbine disposed within the discharge duct to rotate responsive to water flow through the discharge duct; and
an electrical generator coupled to the low-head turbine such that the electrical generator produces electrical power responsive to rotation of the low-head turbine.

13. A river flow power converter comprising:
a plurality of openings each disposed on an incline at an elevation to receive river flow water as the water flows over the incline;
a storage chamber coupled to one or more of the ramp openings for capturing river flow water received thereby and retaining the captured water;
a discharge duct defining a cross-sectional flow area (A) and having a length (L) disposed to hydraulically couple the storage chamber to an exit that is disposed so that the local hydraulic pressure at the discharge duct exit is reduced by the flow of river water over the discharge duct exit; and
a generator for producing electrical power from a flow of captured water in the discharge duct arising from a hydraulic pressure difference between the storage chamber and the discharge duct exit.

14. The river flow power converter of claim 13 wherein the discharge duct cross-sectional flow area (A) varies over at least part of the discharge duct length (L).

15. The river flow power converter of claim 14 wherein the discharge duct cross-sectional flow area (A) varies monotonically over at least part of the discharge duct length (L).

16. The river flow power converter of claim 15 wherein the plurality of openings are disposed to prevent at least some floating debris from entering the storage chamber, thereby promoting conversion of river flow kinetic energy to potential energy embodied at least in part as a hydraulic pressure difference.

17. The river flow power converter of claim 15 wherein the generator further comprises:
a closed low-head turbine disposed within the discharge duct to rotate responsive to water flow through the discharge duct; and
an electrical generator coupled to the low-head turbine such that the electrical generator produces electrical power responsive to rotation of the low-head turbine.

18. The river flow power converter of claim 13 wherein the plurality of openings are disposed to prevent at least some floating debris from entering the storage chamber, thereby promoting conversion of river flow kinetic energy to potential energy embodied at least in part as a hydraulic pressure difference.

19. The river flow power converter of claim 13 wherein the opening elevation varies non-linearly with respect to the relative disposition of the opening along the direction of river flow.

20. The river flow power converter of claim 13 wherein the generator further comprises:
a closed low-head turbine disposed within the discharge duct to rotate responsive to water flow through the discharge duct; and
an electrical generator coupled to the low-head turbine such that the electrical generator produces electrical power responsive to rotation of the low-head turbine.

* * * * *